United States Patent
Tomita

(10) Patent No.: US 9,404,798 B2
(45) Date of Patent: Aug. 2, 2016

(54) CONTROL APPARATUS AND CONTROL METHOD HAVING A SLIT SELECTION BASED UPON ACQUIRED HALF VALUE WAVELENGTH OF INCIDENT SPECTRUM

(71) Applicant: NEC Corporation, Tokyo (JP)

(72) Inventor: Hideya Tomita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 66 days.

(21) Appl. No.: 14/468,900

(22) Filed: Aug. 26, 2014

(65) Prior Publication Data

US 2015/0144766 A1    May 28, 2015

(30) Foreign Application Priority Data

Nov. 26, 2013    (JP) .................................. 2013-244132

(51) Int. Cl.
*G01J 3/04*    (2006.01)
*G01J 3/18*    (2006.01)

(52) U.S. Cl.
CPC .... *G01J 3/04* (2013.01); *G01J 3/18* (2013.01); *G01J 2003/042* (2013.01); *G01J 2003/045* (2013.01)

(58) Field of Classification Search
CPC ..................... G01J 2003/042; G01J 2003/045; G01J 3/32; G01J 3/457; G01J 3/2823; G01J 3/04
USPC ................... 250/226, 214.1, 216, 208.1, 221; 356/399–401, 450, 521, 305, 330; 355/30, 53–69
See application file for complete search history.

(56) References Cited

U.S. PATENT DOCUMENTS 6,671,054 B2 *    12/2003    Goldstein ........... G03F 7/70591
356/450

FOREIGN PATENT DOCUMENTS

JP    2012-230074 A    11/2012

* cited by examiner

*Primary Examiner* — Que T Le
(74) *Attorney, Agent, or Firm* — Young & Thompson

(57) ABSTRACT

A control apparatus includes a slit plate including a plurality of rectangular slits with different widths. The control apparatus also includes an acquisition unit which acquires an incident spectrum from the rectangular slit. The apparatus also includes a slit selecting unit which acquires a half value wavelength of the incident spectrum on the basis of the incident spectrum, and performs a selection of one of the plurality of rectangular slits on the basis of the half value wavelength.

14 Claims, 13 Drawing Sheets

Fig.5

250 DB UNIT

| CLASSIFICATION | ITEM | $\lambda_A$ [nm] | $\alpha$ [nm] | $\lambda_B$ [nm] | $\beta$ [nm] |
|---|---|---|---|---|---|
| TARGET | HUMAN SKIN | $\lambda_{A\_1}$ | $\alpha_1$ | $\lambda_{B\_1}$ | $\beta_1$ |
| | HAIR COLOR | $\lambda_{A\_2}$ | $\alpha_2$ | $\lambda_{B\_2}$ | $\beta_2$ |
| | ... | ... | ... | ... | ... |
| NON-TARGET | MARINE | $\lambda_{A\_3}$ | $\alpha_3$ | $\lambda_{B\_3}$ | $\beta_3$ |
| | FOREST | $\lambda_{A\_4}$ | $\alpha_4$ | $\lambda_{B\_4}$ | $\beta_4$ |
| | ... | ... | ... | ... | ... |

CONTROL APPARATUS AND CONTROL METHOD HAVING A SLIT SELECTION BASED UPON ACQUIRED HALF VALUE WAVELENGTH OF INCIDENT SPECTRUM

INCORPORATION BY REFERENCE

This application is based upon and claims the benefit of priority from Japanese patent application No. 2013-244132, filed on Nov. 26, 2013, the disclosure of which is incorporated herein in its entirety by reference.

BACKGROUND

This document relates to an apparatus and a method which control a slit width.

RELATED ART

In a marine salvage operation, the hyper spectrum sensor is used widely. In the salvage operation, it is necessary to judge quickly whether a search target (hereinafter, referred to as target) exists in a search area or not, and accuracy on the judgment depends mainly on wavelength resolution of a sensor. An optical component, which controls an amount of incident light inputted into a sensor, is called a slit. The wavelength resolution is improved particularly by making a slit width narrow, and consequently it is possible to acquire a detailed spectrum image.

Patent Literature 1 discloses a slit width determining condition which enables to acquire a true spectrum peak from a specimen whose spectrum shape is unknown, and a spectrophotometer which uses the slit width determining condition. The disclosure mentioned above includes a light source, a diffraction grating to separate light, which is emitted from the light source, into monochromatic light, a light acquiring unit, and a plurality of slits through which the light from the light source passes and whose widths are different each other. A spectrum is acquired per the slit width from a spectrum which is generated by applying monochromatic light to a specimen. Afterward, on the basis of a result of comparing the spectra which are acquired per the slit width, a slit condition which is used for acquiring the spectrum of the specimen, and which specifies a relation between at least one slit width and at least one wavelength range which applies the slit width. By virtue of the above, it is possible to determine the wavelength resolution which is optimum for acquiring the spectrum of the specimen.

Patent Literature 1, in particular, is Japanese Patent Application Laid-Open No. 2012-230074.

The hyper spectrum sensor has fine wavelength resolution such as 1 nm to 10 nm, and furthermore has quite many continuous bands. While it is possible to acquire detailed information on each wavelength if outputting data per the wavelength, there is a problem that a whole amount of data becomes large. In the case of judging whether the target exists in an acquisition range or not, it is impossible to carry out quick judgment according to the slit width determining method which is disclosed in the Patent Literature 1. The reason is that, since spectrum intensity is compared all over the acquired wavelength band, it is impossible to ignore a process time for the comparison.

SUMMARY

To solve the problem, the exemplary embodiments provide an apparatus and a method for controlling a slit width which are able to judge quickly and correctly whether the target exists in the acquisition area or not. However, the exemplary embodiments may achieve objectives other than those described above. Further, exemplary embodiments are not required to achieve the objectives described above, and an exemplary embodiment may not achieve any of the objectives described above.

A first aspect of the exemplary embodiment is directed to an apparatus includes a slit plate which includes a plurality of rectangular slits with different widths, an acquisition unit which acquires an incident spectrum from the rectangular slit, and a slit selecting unit which acquires a half value wavelength of the incident spectrum on the basis of the incident spectrum and performs a selection of one of the plurality of rectangular slits on the basis of the half value wavelength.

A second aspect of the exemplary embodiment is directed to a method for controlling an apparatus. The method includes acquiring an incident spectrum obtained from incident light which passes through a rectangular slit, wherein the rectangular slit is included in a plurality of rectangular slits with different widths, wherein the plurality of rectangular slits are arranged in a slit plate of the apparatus. The method includes calculating a half value wavelength of the incident spectrum. The method includes performing a selection of one of the plurality of rectangular slits on the basis of the half value wavelength.

A third aspect of the exemplary embodiment is directed to an apparatus includes an acquisition means for acquiring an incident spectrum obtained from incident light which passes through a rectangular slit, wherein the rectangular slit is included in a plurality of rectangular slits with different widths, wherein the plurality of rectangular slits are arranged in a slit plate of the apparatus; and a selecting means for calculating a half value wavelength of the incident spectrum, and selecting one of the plurality of rectangular slits on the basis of the half value wavelength.

BRIEF DESCRIPTION OF THE DRAWINGS

FIG. 5 illustrates an example of data stored in a DB unit;
FIG. 7 illustrates an example of an incident spectrum acquired in the case of using a slit a.

DETAILED DESCRIPTION

With reference to the drawings, exemplary embodiments will be described. The word "exemplary "is used herein to mean" serving as an example, instance, or illustration". Any embodiment described herein as" exemplary" is not necessarily to be construed as preferred or advantageous over other embodiments The exemplary embodiment will be described in detail with reference to a drawing. In the exemplary embodiment, lifesaving at a time of a marine accident is assumed as an example, and a target is assumed to be a person. Here, the present embodiment is not limited to an exemplary embodiment mentioned later, and it is possible to make various modifications within the spirit and scope of the embodiment.

First Exemplary Embodiment

Figure 1:
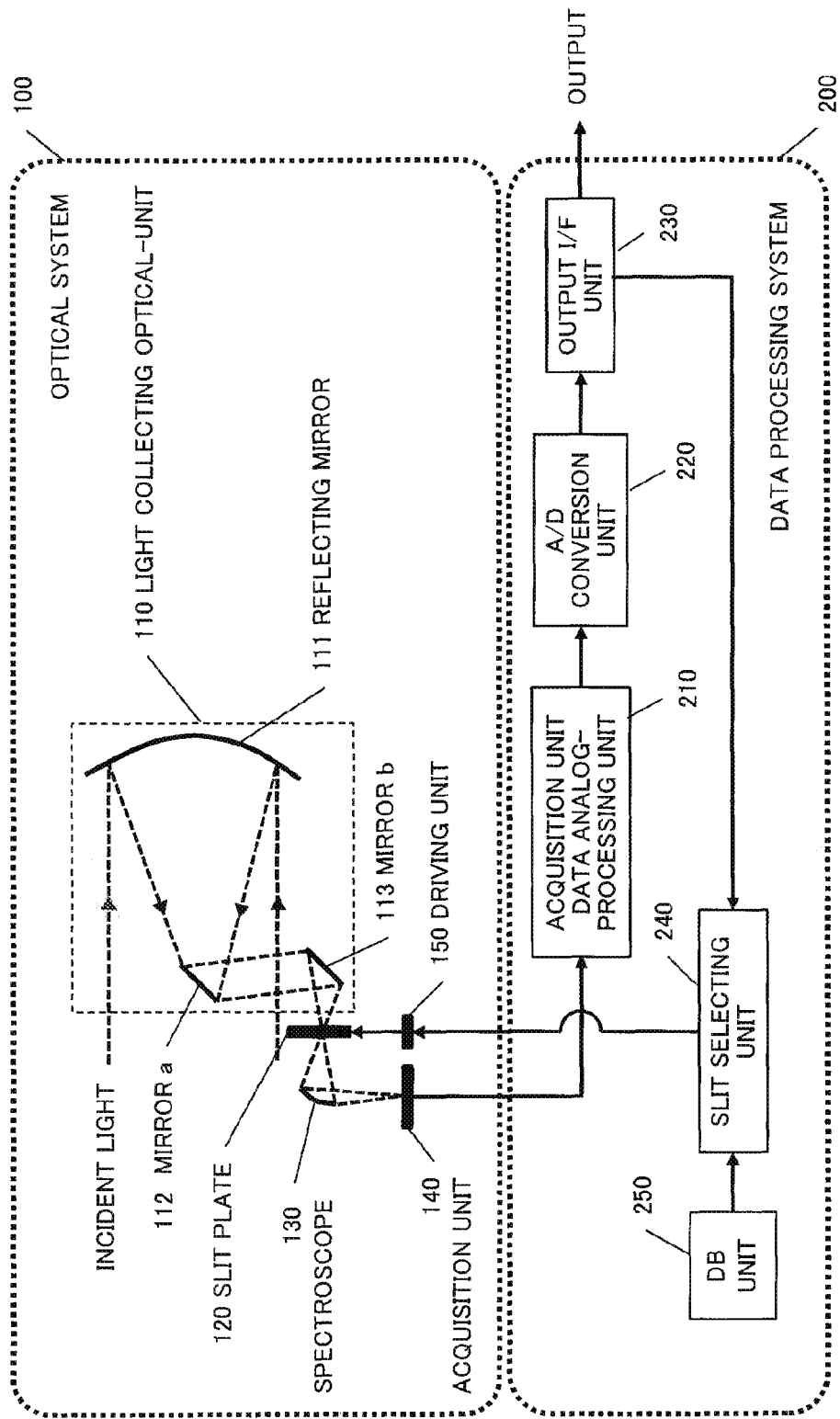
FIG. 1 illustrates a schematic diagram of an apparatus of a first exemplary embodiment.

FIG. 1 is a schematic diagram of an apparatus controlling a slit width. The apparatus according to the exemplary embodiment includes an optical system 100 and a data processing system 200 which processes analog image information provided by the optical system. The optical system 100 includes a light collecting optical-unit 110, a slit plate 120, a spectroscope 130, an acquisition unit 140, and a driving unit 150. The data processing system 200 includes an acquisition unit data analog-processing unit 210, an analog-to-digital conversion unit (hereinafter, A/D conversion unit 220 or A/D convertor), an output interface unit (hereinafter, output I/F unit) 230, a slit selecting unit (selector) 240, and a database unit (hereinafter, DB unit or database (DB)) 250.

The light collecting optical-unit 110 collects incident light emitted from a target. The incident light, which is reflected by a reflecting mirror 111, is collected on the slit plate 120 after passing through a mirror a 112 and a mirror b 113. Afterward, the collected light passes through a rectangular slit which is arranged in the slit plate, and then the light passing through the slit is resolved into each wavelength by the spectroscope 130 to be inputted to the acquisition unit 140. While a catoptric system including the reflecting mirror 111 which includes a concave base, and two mirrors a112 and b113 is used in FIG. 1, a dioptric system which uses a light collecting lens in place of the reflecting mirror may be used.

Figure 2:
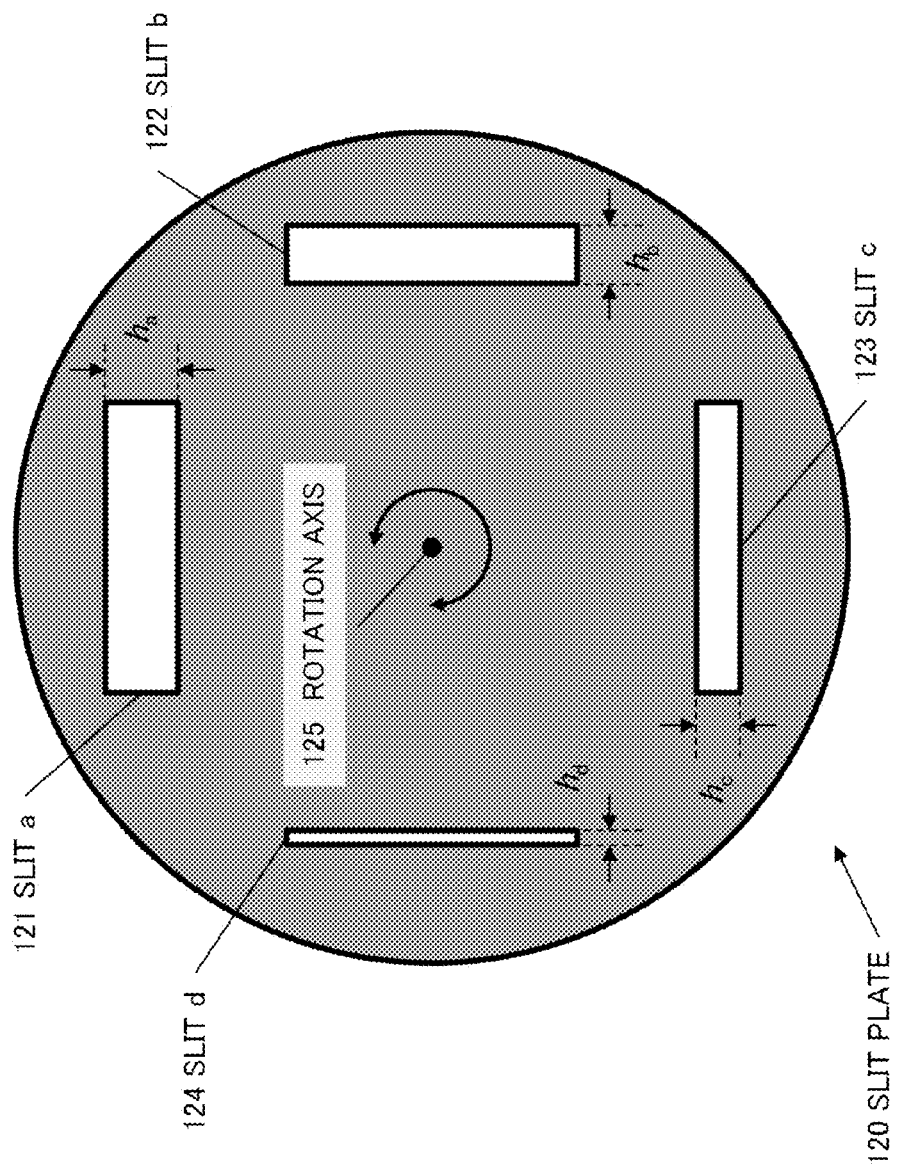
FIG. 2 illustrates a composition diagram of a slit plate.
Figure 3:
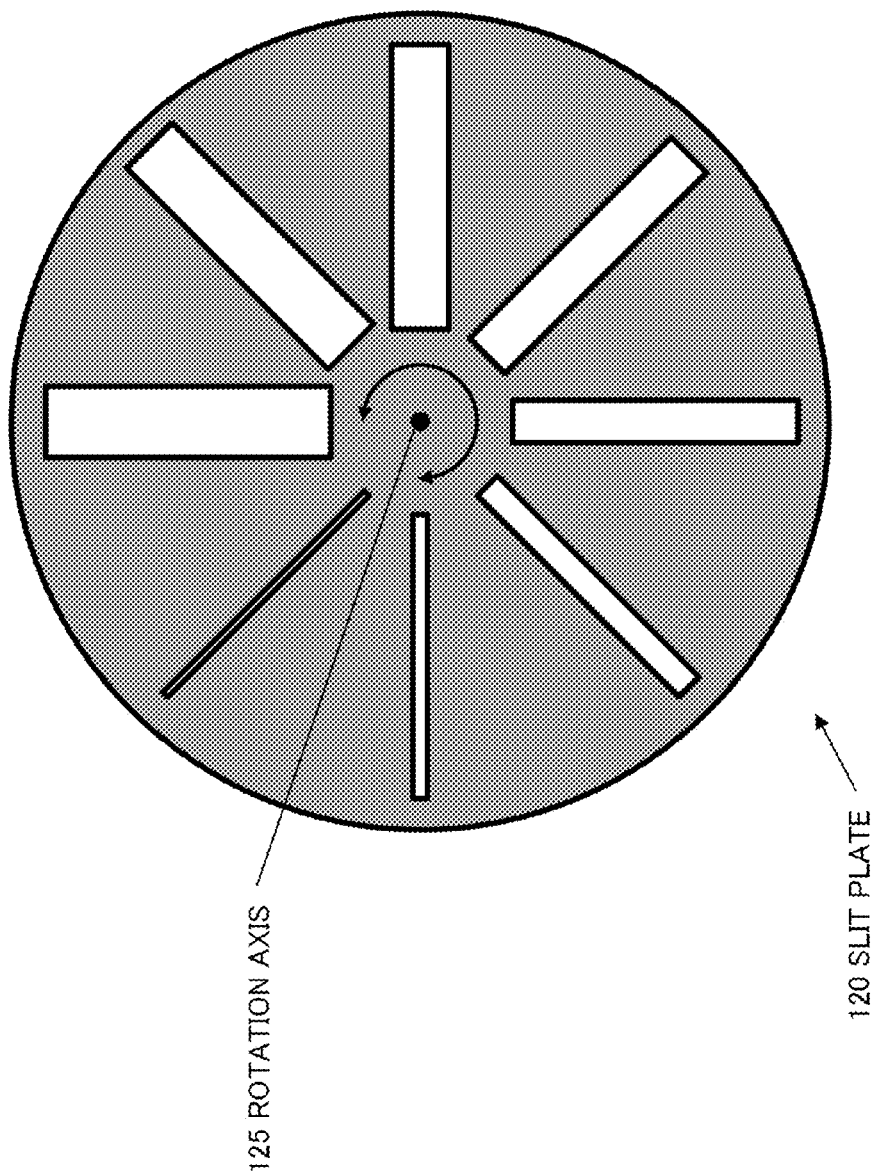
FIG. 3 illustrates a composition diagram of the slit plate.

The slit plate 120 is an optical component which controls an amount of the incident light which the light collecting unit 110 collects. The slit is space which includes a rectangular shape and which is formed in a direction of plate thickness of the slit plate 120. In the case of the exemplary embodiment, four rectangular slits a to d, whose widths are different each other, are arranged. FIG. 2 shows structure of the slit plate 120. Here, the slit widths of the rectangular slits a to d are denoted as $h_a$, $h_b$, $h_c$ and $h_d$ respectively which are set so as to satisfy the following formula.

$$h_a > h_b > h_c > h_d$$

Since the wavelength resolution is generally in inverse proportion to the slit width, the wavelength resolution is lowest in the case of the slit a, and becomes high in an order of b and c, and is highest in the case of the slit d. Long sides of the rectangular slits a to d have an identical length. While the case of using four slits is shown in the exemplary embodiment, it is not always necessary that number of the slits is four, and furthermore the slits may be arranged so as to be radial around a rotation axis 125.

The spectroscope 130 is an optical component which resolves the incident light, which passes through the slit, according to the wavelength and acquires an incident spectrum. Since it is possible to collect directly reflection light, which is generated by a diffraction grating, on the acquisition unit 140 by using a concave diffraction grating in this case, it is possible to realize an apparatus which includes simple structure without using a light collecting optical-component such as a lens or the like.

The acquisition unit 140 acquires the incident spectrum and outputs the acquisition result to the data processing system 200.

The incident spectrum acquisition result outputted by the acquisition unit 140 is inputted to the acquisition unit data analog-processing unit 210 which eliminates noise, the A/D conversion unit 220 which carries out the Analog-to-Digital conversion (A/D conversion), and the output I/F 230 which outputs the spectrum acquisition result in this order.

The slit selecting unit 240 outputs a designation signal, which designates any one out of the rectangular slits a to d which are arranged in the slit plate 120, to the driving unit on the basis of the incident spectrum acquisition result outputted by the acquisition unit 140.

Figure 4:
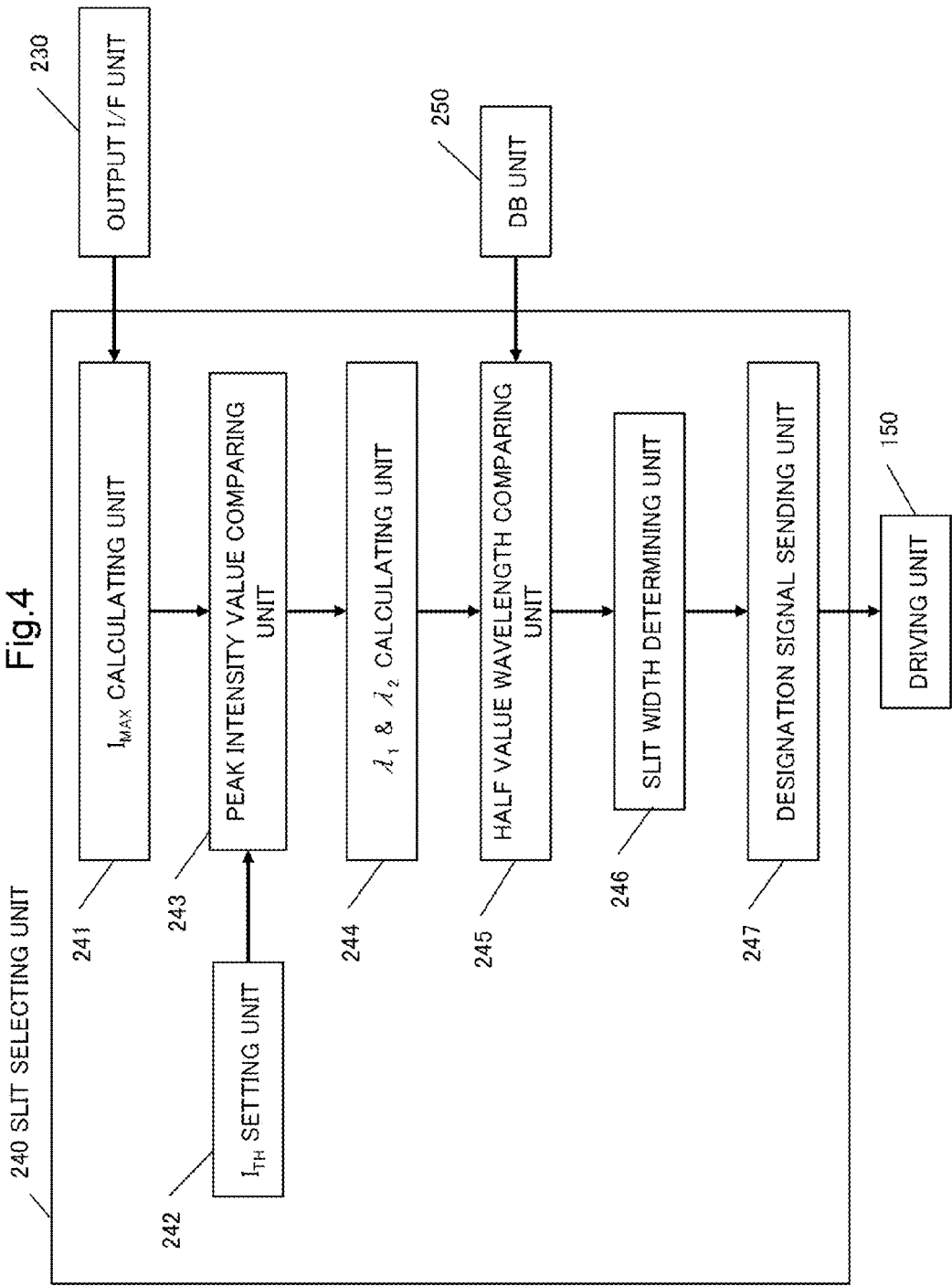
FIG. 4 illustrates a configuration diagram of a slit selecting unit.

FIG. 4 shows a configuration of the slit selecting unit. The slit selecting unit 240 includes an $I_{max}$ calculating unit (calculator) 241 which calculates a peak intensity value $I_{max}$ of the incident spectrum, an $I_{th}$ setting unit 242 which sets a peak intensity threshold value $I_{th}$, a peak intensity value comparing unit 243 which compares $I_{max}$ and $I_{th}$, a $\lambda_1$ and $\lambda_2$ calculating unit 244 which calculates wavelengths which have the intensity of the incident spectrum equivalent to half of $I_{max}$, that is, calculates half value (power) wavelengths $\lambda_1$ and $\lambda_2$ ($\lambda_1 < \lambda_2$), a half value wavelength comparing unit 245 which compares the calculated $\lambda_1$ and $\lambda_2$ with predetermined half value wavelengths $\lambda_A$ and $\lambda_B$ ($\lambda_A < \lambda_B$) respectively which the target includes and are stored in the DB unit, a slit determining unit 246 which determines the slit on the basis of the peak intensity value comparison result and the half value wavelength comparison result, and a designation signal sending unit 247 which sends a slit designation signal corresponding to the determined slit to the driving unit 150.

The DB unit 250 stores degrees of accuracy $\alpha$ and $\beta$, which are used when judging coincidence of $\lambda_1$ and $\lambda_2$ with $\lambda_A$ and $\lambda_B$ respectively, in addition to $\lambda_1$ and $\lambda_2$, and outputs $\lambda_A$, $\lambda_B$, $\alpha$ and $\beta$ to the half value wavelength comparing unit 245 according to an observer's instruction. FIG. 5 shows an example of data stored in the DB unit. Data is mainly classified as a target and a non-target, and $\lambda_A$, $\lambda_B$, $\alpha$ and $\beta$ corresponding to each item are registered. In the case of lifesaving, the target data is exemplified as a human skin, a hair color, or the like, and an environment around the target such as an ocean and a forest is registered as the non-target data. Particularly, in the case that the target is human life, it is possible to make a possibility of successful lifesaving high by setting $\alpha$ and $\beta$ to small values of about 1 nm to 3 nm respectively and making a degree of coincidence high.

The driving unit 150 includes a motor or various actuators, and rotates the slit plate 120 in a circumferential direction around the rotation axis 125 according to the designation signal issued by the slit selecting unit 240. At this time, the designated slit is positioned so as to be arranged on an incident light path where the light collecting optical-unit 110 collects the light.

Figure 6:
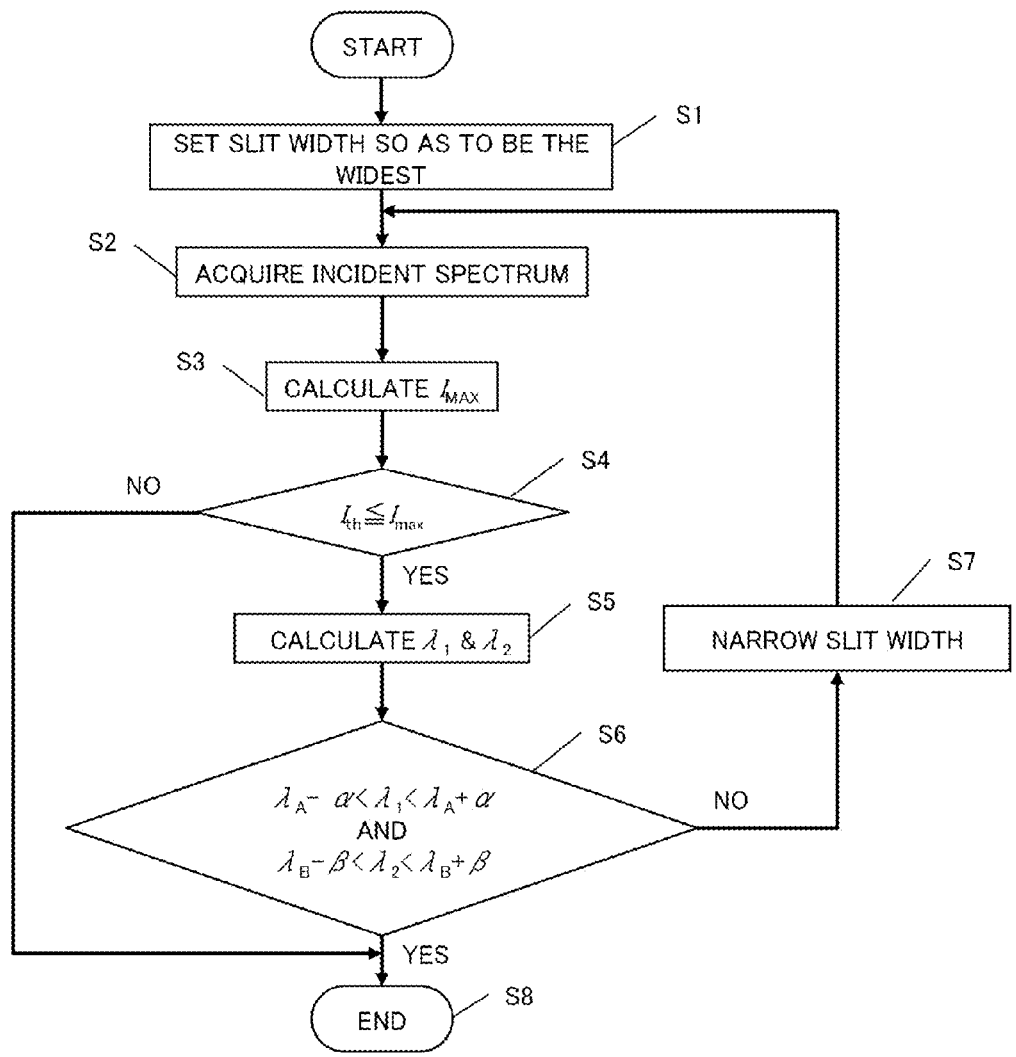
FIG. 6 illustrates a flowchart of the first exemplary embodiment.

Next, an operation of the slit width controlling apparatus according to the exemplary embodiment will be described with reference to FIG. 6. It is assumed that the slit plate 120 used in this case is shown in FIG. 2, and includes, as an example, four rectangular slits a to d whose widths are different each other.

Figure 7:
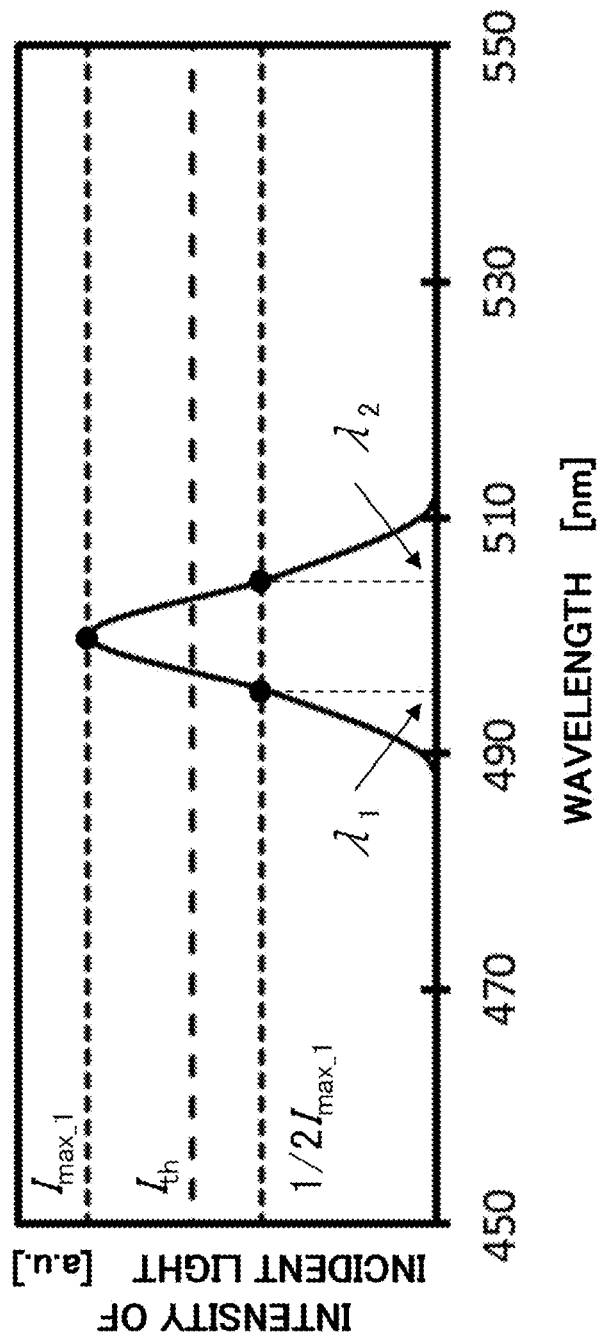

The slit selecting unit 240 outputs the designation signal, which designates the slit a having the widest slit width, to the driving unit 150 (S1). On the basis of the designation signal issued by the slit selecting unit 240, the driving unit 150 rotates the slit plate 120 so that the slit a may be arranged on the incident light path where the light is collected. Next, the acquisition unit 140 acquires the incident spectrum (S2). FIG. 7 shows an example of a result of acquiring the incident spectrum. In the exemplary embodiment, it is assumed that a waveform of the acquired incident spectrum includes a single peak.

The $I_{max}$ calculating unit 241 calculates a peak intensity value $I_{max\_a}$ of a case that the slit a is used on the basis of the acquired incident spectrum (S3). For example, a peak holding circuit is used for calculation of $I_{max\_a}$. Next, the $I_{th}$ setting unit 242 sets $I_{th}$ on the basis of an input which an observer generates by using an input apparatus which is not shown in the figure. It is possible to set or change $I_{th}$ optionally according to an incident spectrum acquisition condition such as visibility or the like. Next, the peak intensity value comparing unit 243 carries out an operation in which $I_{max\_a}$ and $I_{th}$ are compared. Then, the process advances towards S5 or S8 according to the comparison result (S4). In the case of $I_{max\_a} < I_{th}$, there are a lot of possibilities that the incident spectrum has not enough signal-to-noise ratio (S/N ratio) against a noise signal. Therefore, a display unit, which is not shown in the figure, displays that $I_{max\_a}$ is smaller than $I_{th}$, and the acquisition of the incident spectrum is stopped (S8). In the case of $I_{max\_a} \geq I_{th}$, since it is conceivable that the incident spectrum intensity has enough S/N ratio against intensity of the noise signal, the process advances towards S5.

In S5, the $\lambda_1$ and $\lambda_2$ calculating unit 244 calculate the half value wavelength of the incident spectrum. In the case that a waveform of the incident spectrum includes a single peak as shown in FIG. 7, a set of $\lambda_1$ and $\lambda_2$ is calculated as the half value wavelength. Next, the half value wavelength comparing unit 245 checks whether the calculated $\lambda_1$ and $\lambda_2$ are coincident with the predetermined half value wavelengths $\lambda_A$ and $\lambda_B$ respectively which the target includes and which are stored in the DB unit 250 (S6). Here, 'coincidence' means that $\lambda_1$ and $\lambda_2$ satisfy the following formulas simultaneously.

$$\lambda_A - \alpha < \lambda_1 < \lambda_A + \alpha \quad \text{formula (1)}$$

$$\lambda_B - \beta < \lambda_2 < \lambda_B + \beta \quad \text{formula (2)}$$

The half value wavelength comparing unit 245 carries out an operation on the basis of the formula (1) and the formula (2). Then, the process advances S7 or S8 according to the operation result. In the case that $\lambda_1$ and $\lambda_2$ satisfy the formula (1) and the formula (2) respectively, the display unit, which is not shown in the figure, displays that the target exists, and the acquisition is ended (S8). On the other hand, in the case that $\lambda_1$ and $\lambda_2$ do not satisfy the formula (1) and the formula (2) respectively, there are a lot of possibilities that the wavelength resolution is insufficient. Then, the slit width determining unit 246 designates the slit b which includes a one rank narrow width in comparison with the slit a, and the designation signal sending unit 247 sends the designation signal to the driving unit 150 (S7). The driving unit 150 rotates the slit plate 120 so that the slit b may be arranged on the incident light path on the basis of the designation signal sent by the designation signal sending unit 247. Afterward, the observation is carried out again and the process which has been carried out to the slit a is carried out to the slit b similarly.

Figure 8:
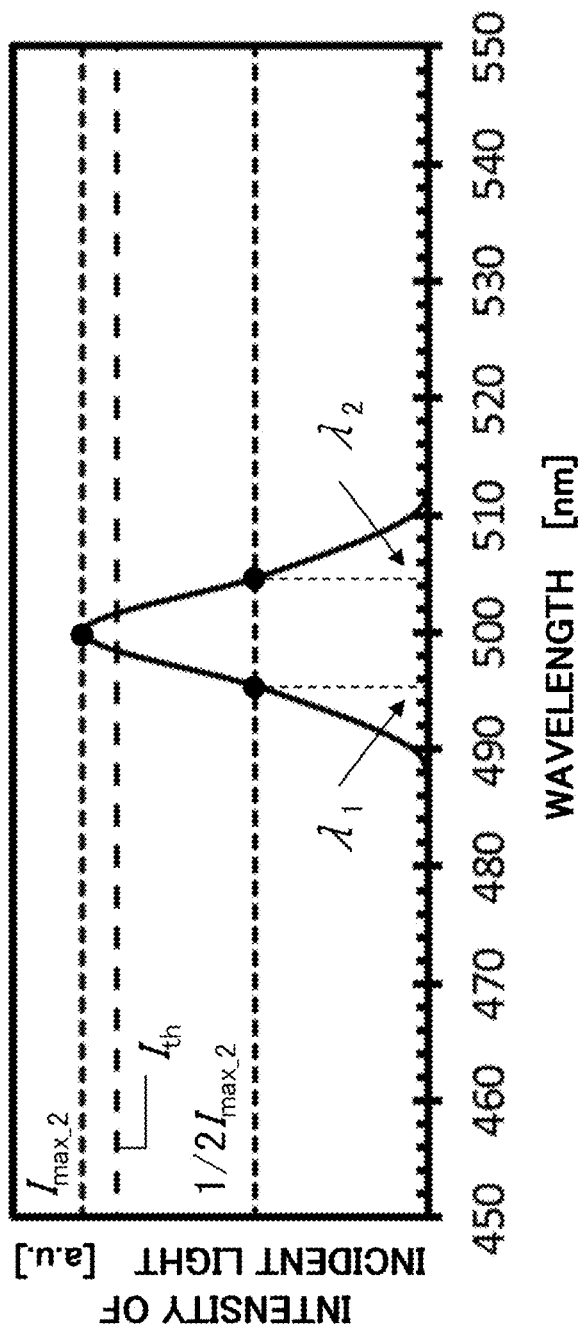
FIG. 8 illustrates an example of an incident spectrum acquired in the case of using a slit b.

FIG. 8 shows an example of a result of acquiring the incident spectrum. An amount of the incident light to the acquisition unit 140 decreases by narrowing the slit width. Therefore, a peak intensity value $I_{max\_b}$, which is acquired in the case of using the slit b, becomes smaller than $I_{max\_a}$. On the other hand, since the wavelength resolution improves by narrowing the slit width, the $\lambda_1$ and $\lambda_2$ calculating unit can use a fine graduation of a scale. As a result, it is possible to calculate $\lambda_1$ and $\lambda_2$ more accurately in comparison with the case of using the slit a. While $\lambda_1$ and $\lambda_2$ which are read from FIG. 7 have the degree of accuracy that $\lambda_1$ exists in a range from 490 nm to 500 nm, and $\lambda_2$ exists in a range from 500 nm to 510 nm, $\lambda_1$ and $\lambda_2$ which are read from FIG. 8 are 496 nm and 504 nm respectively.

According to the exemplary embodiment, in the case that it is found that the target exists in the acquisition area, or in the case that it is found that $\lambda_1$ and $\lambda_2$ do not satisfy the formula 1 and the formula 2 respectively after the similar process is applied in an order of the slit c and the slit d, the process is ended (S8).

While the wavelength resolution improves as the slit width becomes narrow, a data processing time cannot be ignored as the slit width becomes narrow. According to the exemplary embodiment, it is possible to realize quickly the wavelength resolution which is necessary and sufficient for judging whether the target exists or not since the judgment is carried out on the basis of the result of acquiring the peak intensity value and the half value wavelength. Moreover, by setting the above-mentioned α and β to a small value such as 5 nm, it is possible to judge correctly whether the target exists or not. Furthermore, by starting the acquisition of the incident spectrum with using the slit which includes the widest width, it is possible to restrain an amount of data necessary for judging whether the target exists or not, and to make number of acquisition processes minimum.

Second Exemplary Embodiment

Figure 9:
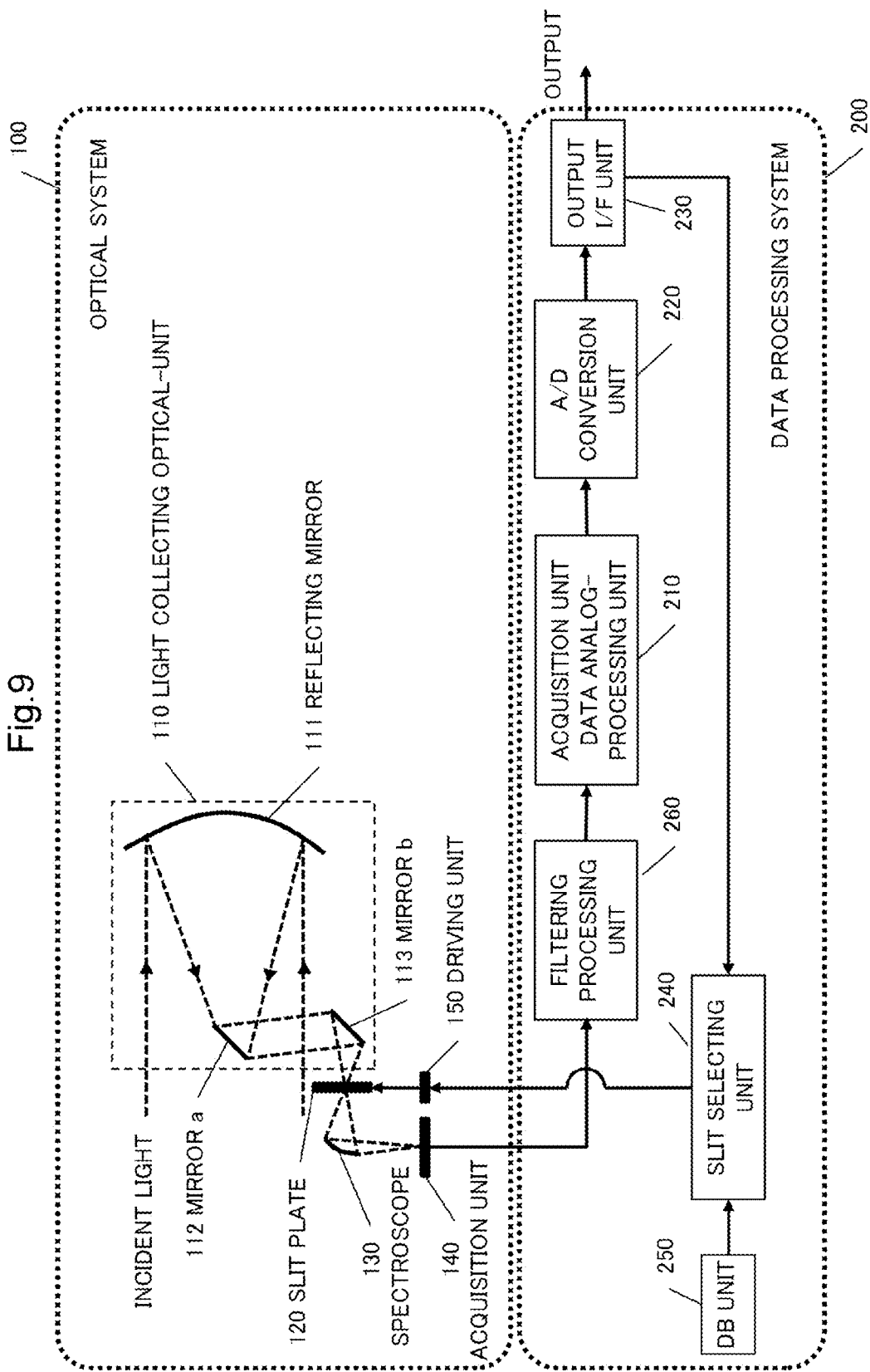
FIG. 9 illustrates a schematic diagram of a slit width controlling apparatus which includes a filtering processing unit.

FIG. 9 is a schematic system diagram of an apparatus controlling a slit width which is a second exemplary embodiment of the present embodiment. The exemplary embodiment is different from the first exemplary embodiment in a point that a filtering processing unit 260 is added to the data processing system 200. A composition requirement similar to the composition requirement according to the first exemplary embodiment has a code identical with the code shown in FIG. 1, and detailed description on the composition requirement is omitted.

The incident light from the acquisition area is led to the data processing system 200 through the optical system 100 which is similar to the optical system 100 of the first exemplary embodiment. After the acquisition data outputted by the acquisition unit 140 is led to the acquisition unit data analog-processing unit 210 through the filtering processing unit 260, a process which is the same as the process of the first exemplary embodiment is carried out.

For example, a band-pass filter (BPF) circuit is used as the filtering processing unit 260. A central wavelength of BPF is set so as to be approximately the same as a central wavelength of the target. The central wavelength of the target may be set to a value which is registered with the DB unit 250 individually, or may be set as an average value of $\lambda_A$ and $\lambda_B$. Moreover, while the filtering processing unit 260 is arranged between the acquisition unit 140 and the acquisition unit data analog-processing unit 210 in FIG. 9, the filtering processing unit 260 may be arranged anywhere, for example, in front of the acquisition unit 140 or the spectroscope 130 as far as being arranged before the acquisition unit data analog-processing unit 210.

It is possible to change a wavelength pass band of BPF appropriately according to the target. Here, the wavelength pass band is defined as the following formula.

$$\lambda_{BPF1} < \lambda < \lambda_{BPF2}$$

$\lambda_{BPF1}$ and $\lambda_{BPF2}$ are set so as to satisfy the following formula (3).

$$(\lambda_{BPF1} < \lambda_A - \alpha) \wedge (\lambda_B + \beta < \lambda_{BPF2}) \quad (3)$$

Figure 10:
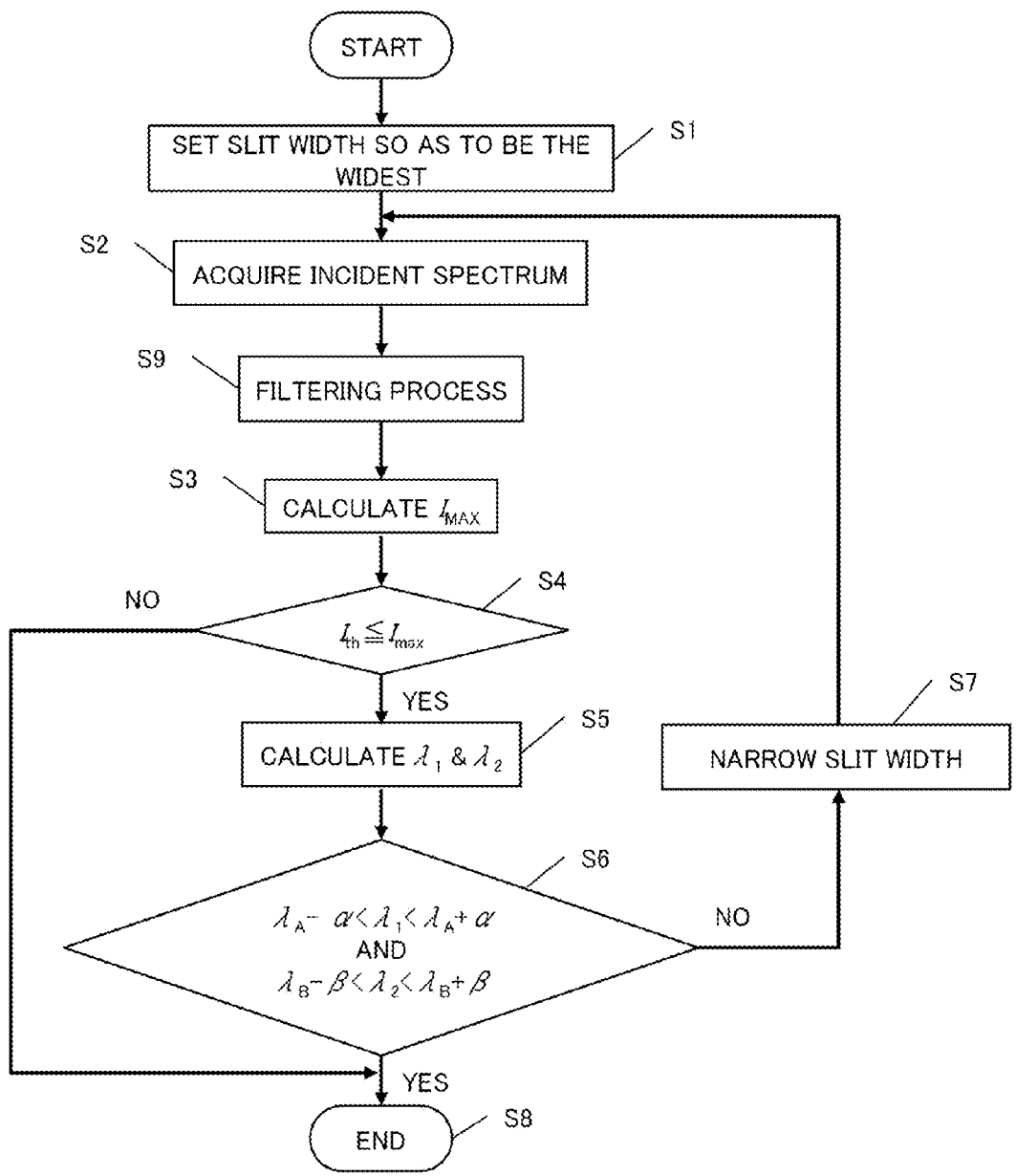
FIG. 10 illustrates a flowchart of a second exemplary embodiment.
Figures 11A, 11B:
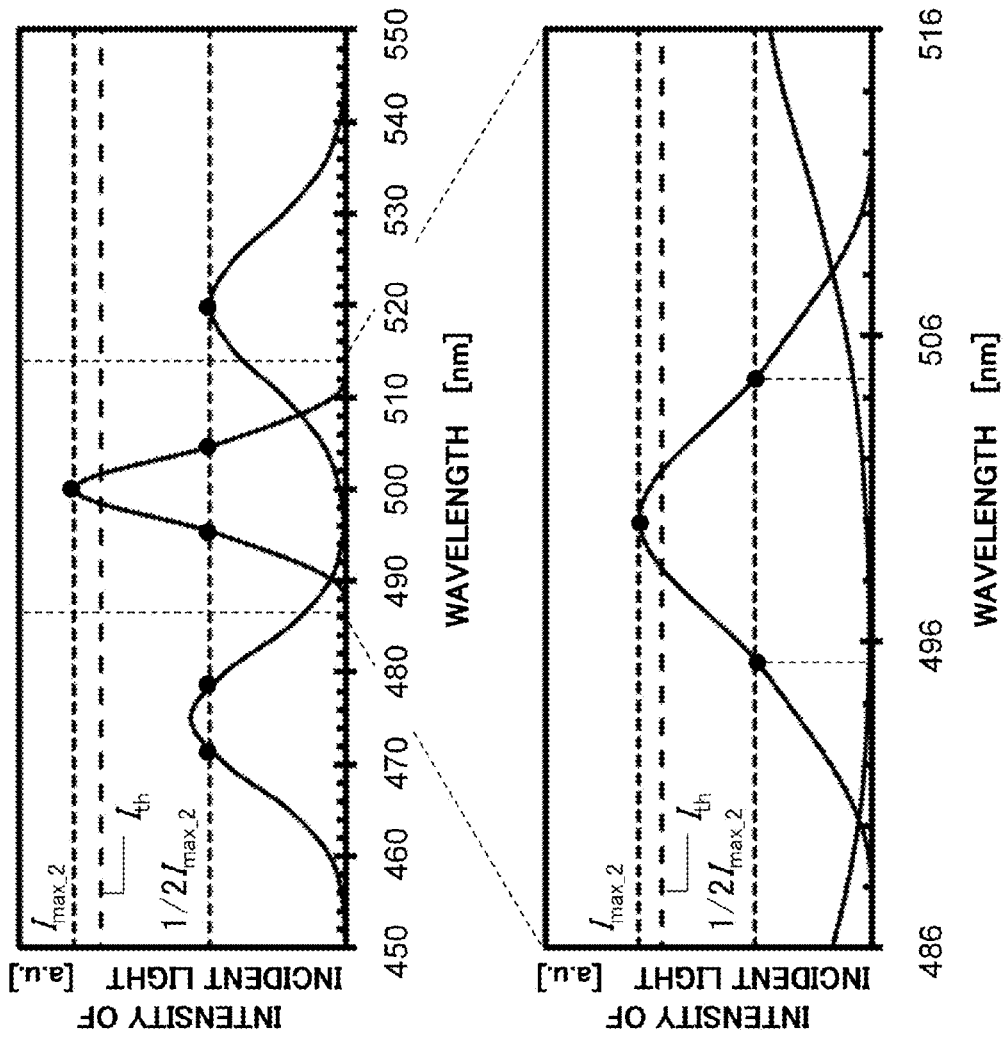
FIG. 11A illustrates an example of an incident spectrum acquired before carrying out a filtering process.
FIG. 11B illustrates an example of an incident spectrum acquired after carrying out the filtering process

Next, an operation of the slit width controlling apparatus according to the exemplary embodiment will be described with reference to FIG. 10. An operation identical with the operation according to the first exemplary embodiment has a code identical with the code shown in FIG. 6, and detailed description on the operation is omitted. A case that an object, which includes a spectrum similar to the spectrum of the target, exists in the acquisition area in addition to the target, will be considered in the following. At this time, an incident spectrum, which has a plurality of peaks simultaneously as shown in FIG. 11A, is acquired. The filtering processing unit 260 carries out a process, in which the BPF circuit passes only the wavelength band, which satisfies the formula (3), to the incident spectrum acquisition result, and the passed wavelength is led to an acquisition unit data analog-processing unit 210 (S9). That is, in the case that a waveform of the incident spectrum has a plurality of peaks, a waveform having a single peak as shown in FIG. 11B is extracted by carrying out the filtering process, and afterward the extracted waveform is led to the acquisition unit analog-processing unit 10. As a result, the $\lambda_1$ and $\lambda_2$ calculating unit 244 can limit the set of $\lambda_1$ and $\lambda_2$ to one set. However, in the case that the filtering processing unit 260 is arranged before the acquisition unit 140, S2 is processed after S9. The acquisition unit data analog-processing unit 210 and its following units carry out processes identical with ones according to the first exemplary embodiment.

As mentioned above, even in the case that the target and a plurality of objects, each of which has a spectrum similar to the spectrum of the target, exist simultaneously in the measurement area, it is possible to focus on the target and to set the wavelength resolution quickly by arranging the filtering processing unit 260 newly. Moreover, it is possible to shorten a time, which is needed for processing the data, since it is possible to reduce an amount of data, which is processed in S3 to S6, by carrying out the filtering process.

Third Exemplary Embodiment

According to the first and the second exemplary embodiments, influence on the acquisition of the incident spectrum, which is caused by good visibility or bad visibility, is not taken into the consideration. In the exemplary embodiment, an operation of the slit width controlling apparatus, which is carried out when the visibility is bad, will be described. Since a configuration of the apparatus is the same as the configuration according to the first exemplary embodiment, detailed description on the configuration is omitted. In the exemplary embodiment, it is assumed that the visibility is acquired by use of a visibility meter which is not shown in the figure, and the visibility is judged to be bad in the case that the visibility is smaller than a predetermined threshold value of visibility.

Under a spectrum acquisition environment that the visibility is bad, an amount of the incident light to the acquisition unit 140 is small generally in comparison with an amount of the incident light measured in the case that the visibility is good. In the case that $I_{th}$, which is usually used when the visibility is good, is used under the acquisition environment mentioned above, there are a lot of possibilities that $I_{max}$ is smaller than $I_{th}$. In this case, the acquisition is ended, and consequently it is impossible to judge whether the target exists or not. Then, according to the exemplary embodiment, an operation, in which $I_{th}$ is lowered only when acquiring the spectrum at the time of the bad visibility in order to carry out easily the judgment whether the target exists or not, is carried out.

Figure 12:
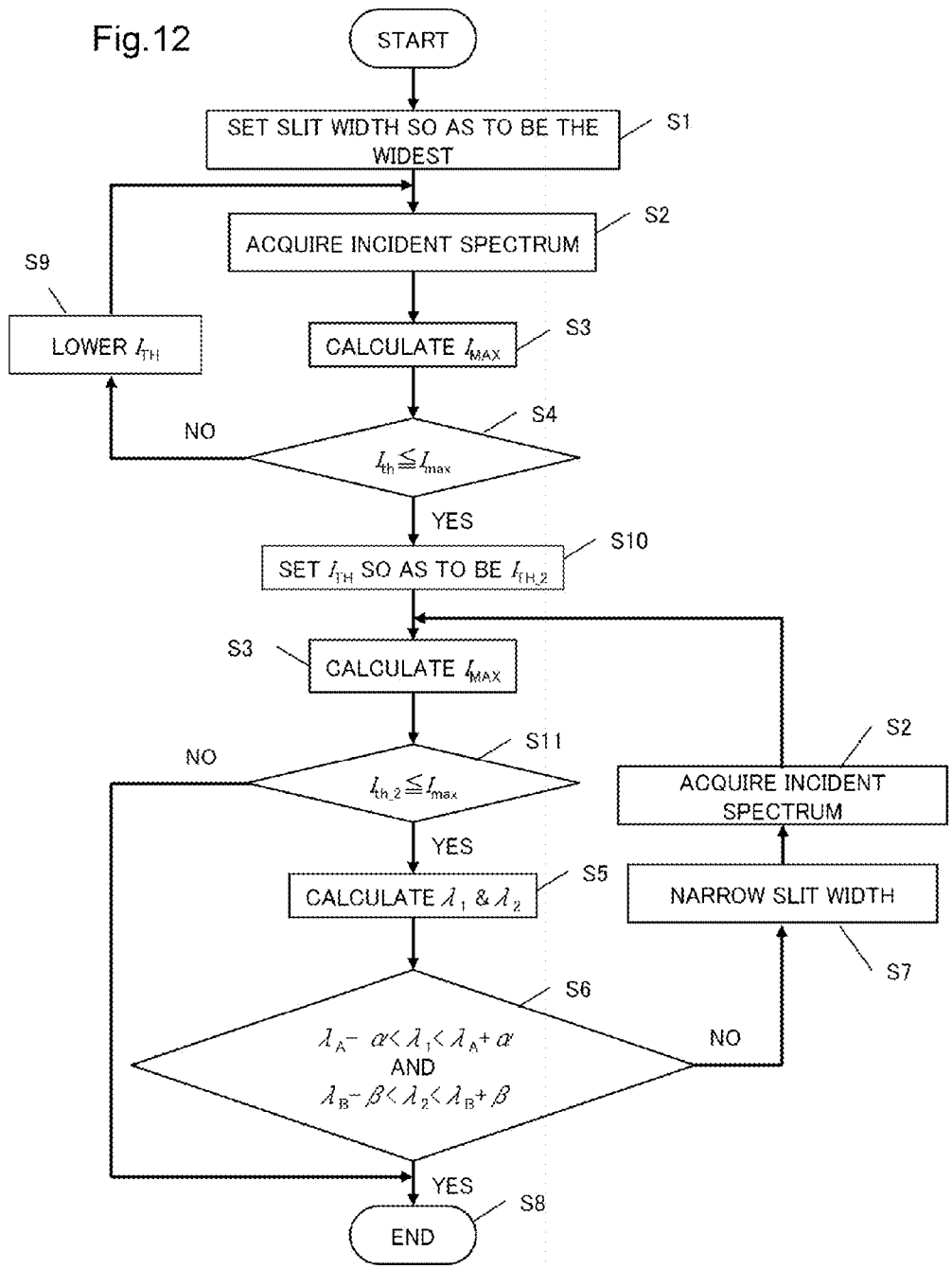
FIG. 12 illustrates a flowchart of a third exemplary embodiment.
Figure 13:
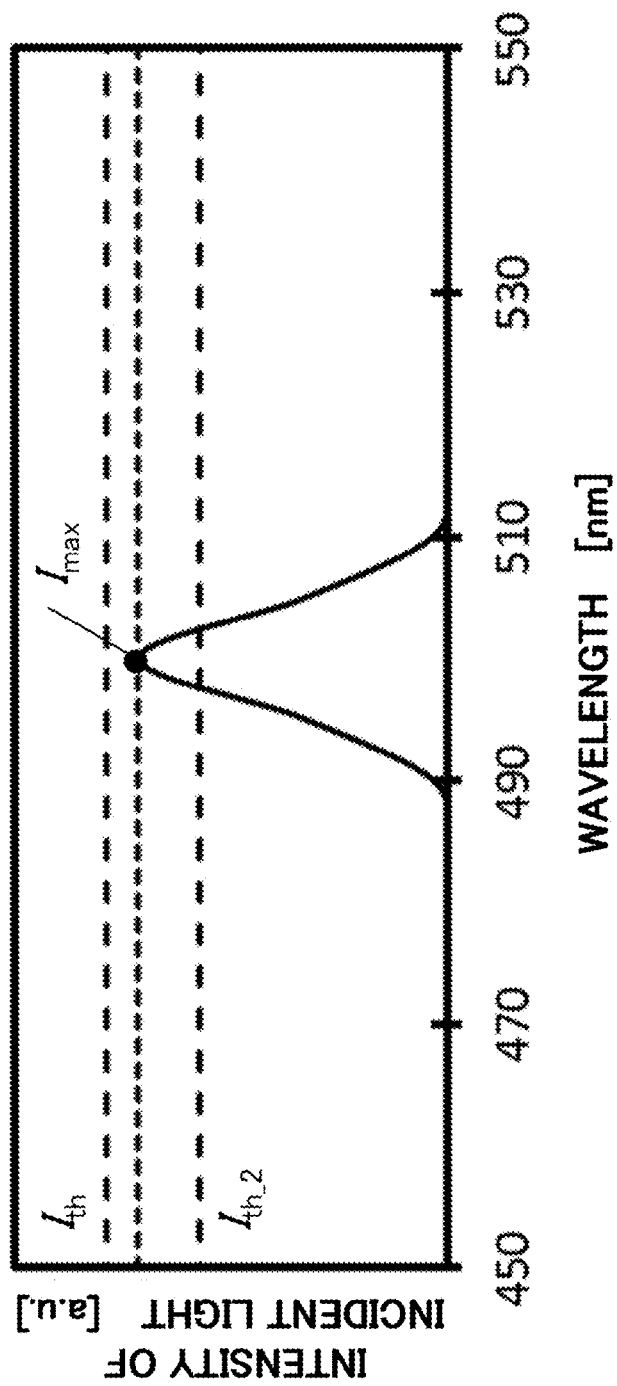
FIG. 13 illustrates an example of a setting change of $I_{th}$.

An operation of the slit width controlling apparatus according to the exemplary embodiment will be described with reference to FIG. 12. An operation identical with the operation according to the first exemplary embodiment has a code identical with the code shown in FIG. 6, and detailed description on the operation is omitted. Firstly, the acquisition of the incident light spectrum is carried out by use of the slit a, which includes the widest width, to get the acquisition result shown in FIG. 13 similarly to the first exemplary embodiment. Next, the $I_{max}$ calculating unit 241 calculates $I_{max}$, and the peak intensity value comparing unit 243 compares $I_{max}$ and $I_{th}$, and then the process advances towards S9 or S10 according to the comparison result. In the case of $I_{th} \leq I_{max}$, a process, which is identical with the process according to the first exemplary embodiment, is carried out. In the case of $I_{th} > I_{max}$, the $I_{th}$ setting unit 242 sets a peak intensity threshold value $I_{th\_2}$, which is smaller than $I_{th}$, is set on the basis of an input which an observer generates by use of an input apparatus which is not shown in the figure (S10). For example, $I_{th\_2} = 0.9 \times I_{th\_1}$. Afterward, the acquisition of the incident spectrum is carried out again, and $I_{max}$ is calculated, and $I_{max}$ is compared with $I_{th\_2}$. In the case of $I_{th\_2} \leq I_{max}$, $I_{th}$ is readjusted so as to be equal to $I_{th\_2}$ (S10). Afterward, a process which is the same as the process according to the first exemplary embodiment is carried out on the basis of $I_{th\_2}$. However, in the case of $I_{th\_2} > I_{max}$, the process is ended.

It is possible to realize quickly the wavelength resolution with which, by lowering $I_{th}$, it is possible to judge whether the target exists in an acquisition target area or not even in the case that the visibility is bad.

The slit width controlling apparatus may include a set of the optical system and the data processing system, or may include another configuration. For example, each of the optical system and the data processing system includes a sending and receiving unit for exchanging information with the outside, and any or all of the acquisition unit data analog-processing unit 210, the A/D conversion unit 220, the output I/F unit 230, the slit selecting unit 240, the DB unit 250 and the filtering processing unit 260 may be mounted on an information processing center or the like which is arranged outside the slit width controlling apparatus. Also by setting the configuration mentioned above, it is possible to acquire a work and effect which is the same as the work and effect of each exemplary embodiment mentioned above.

While the concave diffraction grating is used as the spectroscope 130 in each exemplary embodiment mentioned above, the present invention is not limited to usage of the concave diffraction grating. A spectroscope, which passes light, such as a prism, a grism or the like may be used. Also by using the prism, the grism or the like mentioned above, it is possible to acquire a work and effect which is the same as the work and effect of each exemplary embodiment mentioned above.

While the light reflected by the diffraction grating is collected directly by use of the concave diffraction grating in each above-mentioned exemplary embodiment, the present invention it is not limited to the usage of the concave diffraction grating. For example, an image creating device which passes light outputted by a convex lens, or a concave mirror may collect light. Also by using the image creating device or the concave mirror, it is possible to acquire a work and effect which is the same as the work and effect of each above-mentioned exemplary embodiment.

As mentioned above, the control apparatus according to the exemplary embodiment includes a slit plate which includes a plurality of rectangular slits whose widths are different each other, an acquisition unit which acquires an incident spectrum outputted from the rectangular slit, and a slit selecting unit which acquires a half value wavelength of the incident spectrum on the basis of the incident spectrum, and selects one out of the plural rectangular slits on the basis of the half value wavelength. According to the exemplary embodiment, it is possible to realize quickly the wavelength resolution which can judge whether the target exists in the acquisition area or not.

The exemplary embodiment can be applied to a search system which searches for a target at a time of the marine accident or the like by use of a spectrum camera such as the hyper spectrum sensor camera.

Several units (processors) have been described in connection with various apparatuses and methods. These units (processors) may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register). Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

EXPLANATION OF REFERENCE NUMERALS

100 optical system
110 light collecting optical-unit
111 reflecting mirror
112 mirror a
113 mirror b
120 slit plate
121 slit a
122 slit b
123 slit c
124 slit d
125 rotation axis
130 spectroscope
140 acquisition unit
150 driving unit
200 data processing system
210 acquisition unit data analog-processing unit
220 A/D conversion unit
230 output I/F unit
240 slit selecting unit
241 $I_{max}$ calculating unit
242 $I_{th}$ setting unit
243 peak intensity value comparing unit
244 $\lambda_1$ and $\lambda_2$ calculating unit
245 half value wavelength comparing unit
246 slit width determining unit
247 designation signal sending unit
250 DB unit
260 filtering processing unit

What is claimed is:

1. A control apparatus comprising:
a slit plate which includes a plurality of rectangular slits with different widths;
an acquisition unit which acquires an incident spectrum from the rectangular slit; and
a slit selecting unit which acquires a half value wavelength of the incident spectrum on the basis of the incident spectrum and performs a selection of one of the plurality of rectangular slits on the basis of the half value wavelength.

2. The apparatus according to claim 1, further comprising:
a database which registers a plurality of sets each of which includes a predetermined half value wavelength and predetermined accuracy corresponding to the predetermined half value wavelength,
wherein the selection is performed on the basis of judgment whether the half value wavelength acquired by the slit selecting unit corresponds to the predetermined half value wavelength registered in the database within a range of the predetermined accuracy.

3. The apparatus according to claim 1, further comprising:
a calculator which calculates a peak intensity value of the incident spectrum; and
a comparing unit which permits the selection of the slit selecting unit if the peak intensity value is not smaller than a predetermined threshold value.

4. The apparatus according to claim 1, further comprising:
a filter which pass only a specific wavelength range of the incident spectrum.

5. The apparatus according to claim 3,
wherein the peak intensity threshold value is determined on the basis of visibility.

6. The apparatus according to claim 1,
wherein a rectangular slit with the widest width is selected when the incident spectrum is started to be acquired.

7. The apparatus according to claim 1, further comprising:
an A/D converter which carries out an A/D conversion to the incident spectrum acquired by the acquisition unit; and
an output interface which outputs an A/D-converted incident spectrum.

8. A method for controlling an apparatus, the method comprising:
acquiring an incident spectrum obtained from incident light which passes through a rectangular slit, wherein the rectangular slit is included in a plurality of rectangular slits with different widths, wherein the plurality of rectangular slits are arranged in a slit plate of the apparatus; and
calculating a half value wavelength of the incident spectrum; and
performing a selection of one of the plurality of rectangular slits on the basis of the half value wavelength.

9. The method according to claim 8, further comprising:
registering a plurality of sets each of which includes a predetermined half value wavelength and predetermined accuracy corresponding to the predetermined half value wavelength,
wherein the selection is performed on the basis of judgment whether the acquired half value wavelength of the incident spectrum corresponds to the registered predetermined half value wavelength within a range of the predetermined accuracy.

10. The method according to claim 8, further comprising:
calculating a peak intensity value of the incident spectrum; and
permitting the selection if the peak intensity value is not smaller than a predetermined threshold value.

11. The method according to claim 8, further comprising:
passing a specific wavelength range of the incident spectrum.

12. The method according to claim 10,
wherein a peak intensity threshold value is determined on the basis of visibility.

13. The method according to claim 8,
wherein a rectangular slit with the widest width is selected when the incident spectrum is started to be acquired.

14. An apparatus comprising:
an acquisition means for acquiring an incident spectrum obtained from incident light which passes through a rectangular slit, wherein the rectangular slit is included in a plurality of rectangular slits with different widths, wherein the plurality of rectangular slits are arranged in a slit plate of the apparatus; and
a selecting means for calculating a half value wavelength of the incident spectrum, and selecting one of the plurality of rectangular slits on the basis of the half value wavelength.

\* \* \* \* \*